United States Patent [19]

Sasaki

[11] Patent Number: 4,671,071
[45] Date of Patent: Jun. 9, 1987

[54] FUEL-VAPOR RECOVERY SYSTEM
[75] Inventor: Michiaki Sasaki, Hatano, Japan
[73] Assignee: Nissan Motor Company, Limited, Japan
[21] Appl. No.: 828,340
[22] Filed: Feb. 11, 1986
[30] Foreign Application Priority Data
    May 7, 1985 [JP] Japan .................... 60-96282
[51] Int. Cl.⁴ ................................ F17C 13/00
[52] U.S. Cl. .................................. 62/54; 55/89;
                                    62/3; 141/45; 220/85 VR
[58] Field of Search .............. 62/9, 54, 3; 55/88,
                        55/89; 220/85 VR, 85 VS; 141/44, 45

[56]            References Cited
        U.S. PATENT DOCUMENTS 3,212,274 10/1965 Eidus ............................... 62/3
3,756,291  9/1973 McGahey et al. ............. 62/54
3,791,422  2/1974 Johnson et al. ............... 62/54
3,921,412 11/1975 Heath et al. ................... 62/54
4,010,779  3/1977 Pollock et al. ................. 62/54
4,050,471  9/1977 Anhegger et al. ........... 137/39

FOREIGN PATENT DOCUMENTS 2034253  4/1971 Fed. Rep. of Germany .
2607953  9/1977 Fed. Rep. of Germany .
3027970  2/1982 Fed. Rep. of Germany .
1276534  6/1972 United Kingdom .
1291307 10/1972 United Kingdom .

Primary Examiner—Ronald C. Capossela
Attorney, Agent, or Firm—Leydig, Voit & Mayer

[57]            ABSTRACT

A device liquefies fuel vapor generated in a fuel tank. An arrangement prevents the liquefied fuel from escaping into the atmosphere. The liquefied fuel may be returned to the fuel tank. A canister may be used to trap fuel vapor which is not liquefied by the device.

18 Claims, 5 Drawing Figures

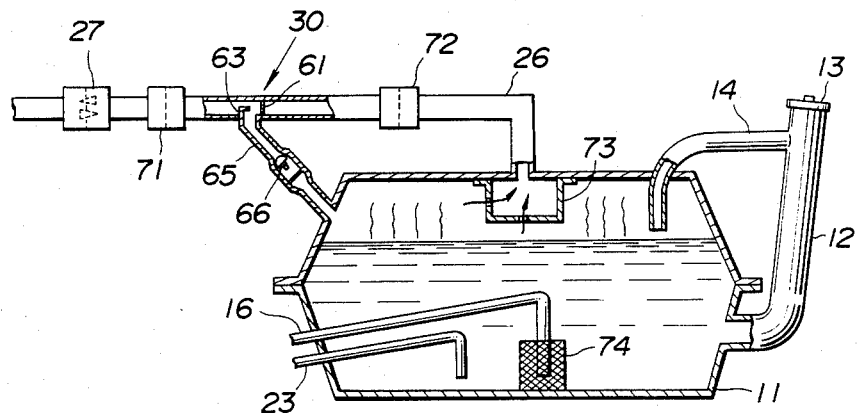
FIG. 3
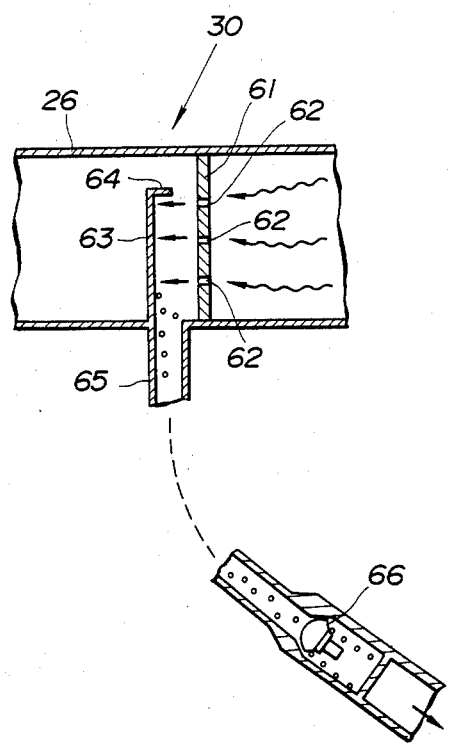
FIG. 4
FIG. 5

FUEL-VAPOR RECOVERY SYSTEM

BACKGROUND OF THE INVENTION

1. Field of the Invention

This invention relates to a fuel-vapor recovery system also called an evaporative emission control system.

2. Description of the Prior Art

It is known to equip automotive vehicles with evaporative emission control systems which prevent fuel vapors from escaping into the atmosphere. These systems include canisters filled with activated charcoal or carbon which trap fuel vapors emitted from fuel tanks and carburetors. The amount of fuel vapor that can be held by the canister is limited. When an excessively large amount of fuel vapor enters the canister, some fuel vapor passes through the canister and into the atmosphere.

SUMMARY OF THE INVENTION

It is an object of this invention to provide a fuel-vapor recovery system which reliably prevents fuel vapors from escaping into the atmosphere.

In accordance with a fuel-recovery system of this invention, a device liquefies fuel vapors generated in a fuel tank. An arrangement prevents the liquefied fuel from escaping into the atmosphere. The liquefied fuel may be returned to the fuel tank. A canister may be used to trap fuel vapor which is not liquefied by the device.

BRIEF DESCRIPTION OF THE DRAWINGS

FIG. 3 is a cut-away view of a fuel-vapor recovery system according to a second embodiment of this invention.

FIG. 4 is an enlarged view of part of FIG. 3.

FIG. 5 is a sectional view of a modification to the embodiment of FIGS. 4 and 5.

Like and corresponding elements are denoted by the same reference characters throughout the drawings.

DESCRIPTION OF THE FIRST PREFERRED EMBODIMENT

Figure 1:
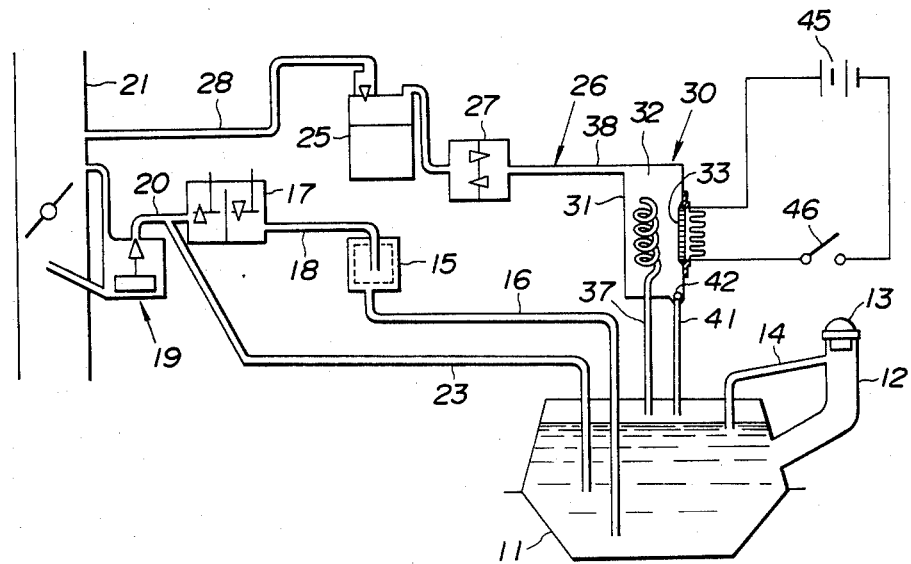
FIG. 1 is a diagram of a fuel-vapor recovery system according to a first embodiment of this invention.

With reference to FIG. 1 showing a fuel-recovery system according to a first embodiment of this invention, a fuel tank 11 is connected to a filler tube 12 having an inlet provided with a detachable filler cap 13. When the filler cap 13 is removed, fuel can be admitted into the fuel tank 11 via the filler tube 12. A ventilation tube 14 connected between the fuel tank 11 and the filler tube 12 allows air to escape from the fuel tank 11 when fuel is admitted into the fuel tank 11.

The fuel tank 11 is connected to an inlet of a fuel filter 15 by means of a first fuel feed tube 16. An outlet of the fuel filter 15 is connected to an inlet of a fuel pump 17 by means of a second fuel feed tube 18. An outlet of the fuel pump 17 is connected to a carburetor 19 by means of a third fuel feed tube 20. The fuel pump 17 drives fuel from the fuel tank 11 to the carburetor 19 via the fuel feed tubes 16, 18, and 20. The carburetor 19 includes a nozzle which serves to inject fuel into an air intake passage 21 of an engine.

The outlet of the fuel pump 17 is connected to the fuel tank 11 by means of a fuel return tube 23, so that excess fuel driven by the fuel pump 17 returns to the fuel tank 11 via the tube 23. Accordingly, fuel is circulated through the fuel pump 17 and the fuel tank 11. This fuel circulation cools the fuel pump 17 and thus prevents vapor from forming. It should be noted that if vapor forms in the fuel pump 17, the fuel return tube 23 allows the vapor back into the fuel tank 11.

A canister 25 containing activated charcoal or carbon is connected to the fuel tank 11 by means of an evaporation tube 26. A check valve 27 disposed in the connection between the fuel tank 11 and the canister 25 allows fuel vapor to move from the fuel tank 11 into the canister 25 when the pressure of fuel vapor within the fuel tank 11 exceeds a predetermined value. The canister 25 is also connected to the air intake passage 21 by means of a canister purge line 28.

When the engine is turned off and the pressure of fuel vapor within the fuel tank 11 exceeds the predetermined value, the check valve 27 allows the fuel vapor to flow from the fuel tank 11 into the canister 25 via the evaporation tube 26. The canister 25 traps the fuel substances and passes the remaining air into atmosphere via an opening in its floor. At the same time, a valve (no reference character) disposed in the connection between the canister 25 and the canister purge line 28 limits or interrupts the flow of fuel vapor from the canister 25 to the air intake passage 21. When the engine is started, intake manifold vacuum developed in the air passage 21 draws fresh air or atmosphere through the canister 25 and the canister purge line 28. This fresh air cleans the fuel vapor out of the canister 25. At the same time, the valve between the elements 25 and 28 essentially freely allows air flow from the canister 25 to the air intake passage 21. When vacuum of a predetermined strength develops within the fuel tank 11, the check valve 27 allows atmosphere to flow into the fuel tank 11 via the canister 25 and the evaporation tube 26.

Figure 2:
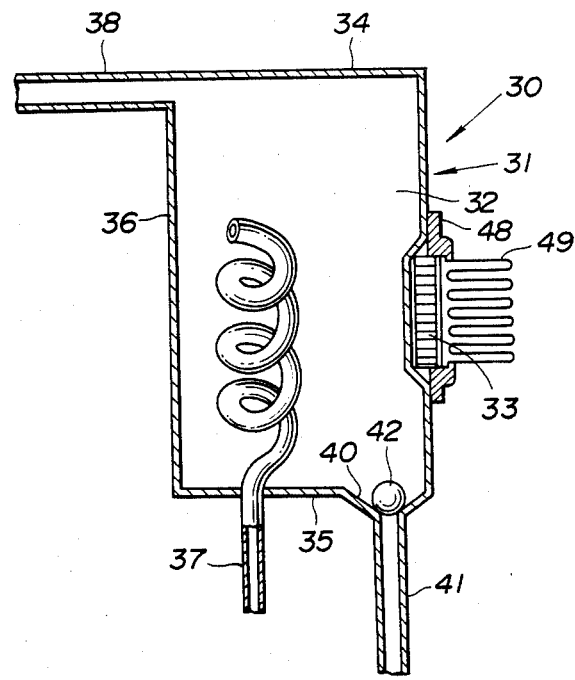
FIG. 2 is a longitudinal section view of the liquefying device of FIG. 1.

As shown in FIGS. 1 and 2, a liquefying device 30 disposed in the connection between the fuel tank 11 and the check valve 27 has a cylindrical casing 31 defining a chamber 32 which can be cooled by a cooling element 33 attached to the casing 31. The axis of the casing 31 is vertical. The casing 31 has an upper end wall 34, a lower end wall 35, and a cylindrical wall 36 therebetween.

A first evaporation pipe 37 forming a segment of the evaporation tube 26 has a lower end connected to the top of the fuel tank 11. An upper end of the evaporation pipe 37 extends into the cooling chamber 32 through the lower casing end wall 35 and terminates within the cooling chamber 32. Fuel vapor moves from the fuel tank 11 to the cooling chamber 32 via the evaporation pipe 37. The fuel vapor is cooled by the chamber 32. As a result of cooling, the fuel vapor condenses into liquid which accumulates in the bottom of the cooling chamber 32. A segment of the evaporation pipe 37 within the cooling chamber 32 is helical to more effectively cool the fuel vapor as it passes through the pipe 37.

A second evaporation pipe 38 forming another segment of the evaporation tube 26 connects the top of the cooling chamber 32 to the check valve 27. Fuel vapor moves from the cooling chamber 32 to the check valve 27 via the evaporation pipe 38.

The lower casing end wall 35 defines a conical recess 40 within the cooling chamber 32. A fuel return pipe 41 connects the bottom of the recess 40 to the fuel tank 11 to allow liquid fuel to return from the cooling chamber 32 to the fuel tank 11. A ball valve 42 accommodated in the recess 40 and having a smaller specific gravity then the fuel selectively blocks and unblocks the fuel return pipe 41. When the level of liquid fuel within the cooling chamber 32 is below a predetermined height, the ball valve 42 rests on a seat defined in the floor of the recess 40, blocking the fuel return pipe 41. This ensures that fuel vapor moves from the fuel tank 11 to the cooling chamber 32 only via the evaporation pipe 37. When the level of liquid fuel exceeds the predetermined height, the ball valve 42 moves up and separates from the seat, unblocking the fuel return pipe 41 and thus allowing the liquid fuel to return to the fuel tank 11 via the pipe 41.

The ball-type valve 42 may be replaced by other types of check valve. In another modification, the valve 42 may be replaced by a restriction or orifice which allows the return of liquid fuel but prevents the flow of fuel vapor from the fuel tank 11 to the cooling chamber 32 via the fuel return pipe 41.

The cooling element 33 includes a Peltier element having first and second different metals in contact with each other. When an electrical current flows through the two metal elements, their contact surfaces generate or absorb heat depending on the direction of the current in accordance with the Peltier effect. The Peltier element 33 is electrically connected in series with a battery 45 via a switch 46. The connection between the Peltier element 33 and the battery 45 is designed such that the direction of the supplied electrical current will allow the metal contact surfaces in the element 33 to absorb heat. When the switch 46 is closed, an electrical current flows through the Peltier elememt 33 so that the cooling element 33 is activated. When the switch 46 is opened, the electrical current is interrupted so that the cooling element 33 is deactivated.

The switch 46 can be an engine ignition switch so as to respond to turning the engine on and off. The switch 46 may alternatively respond to the temperature of fuel within the fuel tank 11 detected by a temperature sensor. In another modification, the switch 46 may respond to the gas pressure within the fuel tank 11 or to the atmospheric pressure detected by a pressure sensor.

The outer surface of the casing cylindrical wall 36 has a recess accommodating a segment of the Peltier element 33. A bracket 48 fixes the Peltier element 33 to the casing cylindrical wall 36. The active part of the Peltier element 33 which most effectively absorbs heat closely contacts the casing cylindrical wall 36 so that the chamber 32 can be cooled efficiently. The part of the Peltier element 33 opposite its active part is provided with cooling fins 49.

It should be noted tht the Peltier element 33 may be of other sizes or shapes. The cooling device may alternatively include a heat exchanger which cools gases in the chamber 32 by means of the cooling medium from an air conditioner.

In operation, when the switch 46 is closed, an electrical current flows through the cooling element 33 so that the element 33 is activated. This activation of the cooling element 33 cools the chamber 32 and also the casing walls 34, 35, and 36. As fuel vapor moves up from the fuel tank 11 to the chamber 32 via the evaporation pipe 37, it is cooled. The helical segment of the evaporation pipe 37 within the chamber 32 allows the fuel vapor to be cooled effectively. After the fuel vapor moves into the cooling chamber 32 from the evaporation pipe 37, a portion of the fuel vapor encounters the casing walls 34, 35, and 36 and condenses on these walls. The condensed fuel, that is, the liquid fuel, drops into the recess 40 in the floor of the cooling chamber 32. As a result, the liquid fuel gradually accumulates in the recess 40. When the level of the liquid fuel in the recess 40 exceeds a predetermined value, the ball value 42 moves up and unblocks the fuel return pipe 41, allowing the liquid fuel to return to the fuel tank 11. It should be noted that the ball valve 42 has a smaller specific density than the fuel. The rest of the fuel vapor moves from the cooling chamber 32 to the canister 25 via the evaprotation pipe 38 and the check valve 27. The canister 25 traps the incoming fuel vapor.

In this way, the device 30 liquefies a portion of fuel vapor and returns it to the fuel tank 11. The rest of the fuel vapor is treated by the canister 25. The proportion of fuel vapor treated by the canister 25 is, therefore, smaller than in conventional fuel-vapor recovery systems having no liquefying device 30. Accordingly, an excessive volume of fuel vapor is prevented from entering the canister 25. It should be remembered that in conventional systems, surplus fuel vapor will escape into the atmosphere through the canister 25. Less activated charcoal or carbon is needed within the canister 25 than in conventional systems.

The fuel vapor trapped by the canister 25 will be supplied to the engine in addition to accurately metered fuel as suggested by the previous description. The smaller volume of the trapped fuel vapor allows more reliable air-to-fuel ratio control than with conventional systems.

DESCRIPTION OF THE SECOND PREFERRED EMBODIMENT

FIGS. 3 and 4 show a fuel-vapor recovery system according to a second embodiment of this invention. This embodiment is similar to the embodiment of FIGS. 1 and 2 except for design changes described below. A major part of the design changes relate to the details of the liquefying device 30.

The liquefying device 30 includes a disc 61 coaxially fitting within the segment of the evaporation tube 26 between the fuel tank 11 and the check valve 27. The disc 61 has small axial holes or orifices 62 which allow fuel vapor to pass through the disc 61.

The liquefying device 30 also includes a plate 63 disposed within the segment of the evaporation tube 26 between the disc 61 and the check valve 27. Specifically, the plate 63 lies near and parallel to the disc 60. As shown in FIG. 4, the plate 63 extends from an inner surface of the evaporation tube 26 to a point near the opposite inner surface of the tube 26. The upper edge of the plate 63 has a flange 64 extending toward the disc 61. The flange 64 is separated from the inner surface of the evaporation tube 26 by a predetermined gap. The flange 64 is also spaced from the disc 61. The plate 63 essentially conceals or opposes all the orifices 62 so that fuel vapor passing through the orifices 62 encounters the plate 63. As will be made clear hereinafter, the plate 63 cooperates with the disc 62 to liquefy fuel vapor.

One end of a fuel return pipe 65 is connected to a lower part of the segment of the evaporation tube 26 between the disc 61 and the plate 63. The other end of the fuel return pipe 65 is connected to the fuel tank 11. This pipe 65 allows liquefied fuel to return to the fuel tank 11. A check valve 66 disposed within the fuel return pipe 65 prevents fuel vapor from moving from the fuel tank 11 to the evaporation tube 26 through the fuel return pipe 65.

A dust-removing filter 71 is disposed within the segment of the evaporation tube 26 between the plate 63 and the check valve 27. A similar filter 72 is disposed within the segment of the evaporation tube 26 between the fuel tank 11 and the disc 61.

A separator 73 fixedly disposed within the fuel tank 11 covers the inlet opening of the evaporation tube 26. When the fuel tank 11 is shaken, the separator 73 prevents liquid fuel from entering the evaporation tube 26. The separator 73 has holes which allow fuel vapor and gas to flow into and out of the evaporation tube 26.

A fuel filter 74 disposed within the fuel tank 11 covers the inlet opening of the fuel feed tube 16.

When the pressure of fuel vapor within the fuel tank 11 exceeds the predetermined value, the check valve 27 allows the fuel vapor to pass through the evaporation tube 26. As the fuel vapor flows, it encounters the disc 61. When the fuel vapor enters the orifices 62 in the disc 61, the speed of flow of the fuel vapor increases, since the cross-sectional area of flow path decreases. This increase in the flow speed causes a pressure drop, which allows the temperature of the fuel vapor to decrease so that a portion of the fuel vapor condenses into particles of liquid suspended in gas. These particles of fuel liquid impinge upon the plate 63 and then merge to form droplets of liquid fuel, which fall along the plate 63 due to their own weight. The liquid fuel enters the fuel return pipe 65. When the volume of the liquid fuel exceeds a predetermined value, the check valve 66 unblocks the fuel return pipe 65 and allows the liquid fuel to return to the fuel tank 11.

The fuel vapor which is not liquefied by the device 30 passes over the plate 63 and then enters the canister 25 (see FIG. 1) via the check valve 27.

FIG. 5 shows a modification to the embodiment of FIGS. 3 and 4. In this modification, the plate 63 is made of a material with excellent heat conductivity. A lower segment of the plate 63 extends downwards through the walls of the evaporation pipe 26. A cooling device 81 connected to the segment of the plate 63 outside the evaporation tube 26 serves to cool the plate 63. A sealing member 82 is provided between the plate 63 and the evaporation tube 26.

The cooling device 81 includes a Peltier element 83 which can be activated by a DC power supply (not shown). The active portion of the Peltier element 83 which most effectively absorbs heat closely contacts the plate 63. The portion of the Peltier element 83 opposite its active portion is provided with cooling fins 84.

Cooling the plate 63 chills the fuel vapor encountering the plate 63 more effectively, so that liquefaction of the fuel vapor is facilitated. As a result, the percentage of fuel vapor which is liquefied and returned to the fuel tank 11 increases relative to the embodiment of FIGS. 3 and 4.

It should be noted that the cooling device 81 may be of the type using a cooling medium.

What is claimed is:

1. A fuel-vapor recovery system comprising:
   (a) a fuel tank containing fuel;
   (b) a canister;
   (c) an evaporation passage connecting the canister to the fuel tank to conduct fuel vapor from the fuel tank to the canister; and
   (d) means for liquefying fuel vapor in the evaporation passage, the liquefying means including means for cooling the fuel vapor and the cooling means including a casing defining a chamber, a cooling element attached to the casing, a first pipe connecting the chamber to the fuel tank to guide the fuel vapor from the fuel tank to the chamber, and a second pipe connecting the chamber to the fuel tank to return the liquefied fuel from the chamber to the fuel tank.

2. The system of claim 1, further comprising means for returning the liquefied fuel to the fuel tank.

3. The system of claim 1, wherein the first pipe extends into the chamber and a segment of the first pipe within the chamber is helical to help cool the fuel vapor.

4. The system of claim 3, further comprising a valve which normally blocks the second pipe to prevent the fuel vapor from entering the chamber via the second pipe and unblocks the second pipe to return the liquefied fuel to the fuel tank when the level of the liquefied fuel within the chamber exceeds a predetermined value.

5. The system of claim 1, wherein the cooling element comprises a Peltier element having an active part in close contact with the casing, and cooling fins attached to a part of the Peltier element opposite its active part.

6. A fuel-vapor recovery system comprising:
   (a) a fuel tank containing fuel;
   (b) a canister;
   (c) an evaporation passage connecting the canister to the fuel tank to conduct fuel vapor from the fuel tank to the canister;
   (d) means for liquefying fuel vapor in the evaporation passage, the liquefying means including a member disposed within the evaporation passage and having an orifice which allows the fuel vapor to pass through the orifice member and a plate disposed in the evaporation passage downstream from the orifice member and essentially opposing the orifice in the orifice member whereby fuel vapor exiting from the orifice encounters the plate;
   (e) a fuel return passage connecting a segment of the evaporation passage between the plate and the orifice member to the fuel tank to return the liquefied fuel to the fuel tank; and
   (f) a valve which normally blocks the fuel return passage to prevent the fuel from exiting from the fuel tank via the fuel return passage and which unblocks the fuel return passage to return the liquefied fuel to the fuel tank when the volume of the liquefied fuel exceeds a predetermined value.

7. The system of claim 6, wherein the plate extends through the evaporation passage and having a segment outside the evaporation passage, and further comprising a cooling device connected to the outside segment of the plate.

8. The system of claim 7, wherein the cooling device comprises a Peltier element having an active part in close contact with the plate, and cooling fins attached to a part of the Peltier element opposite its active part.

9. A fuel-vapor recovery system comprising:
   (a) a fuel tank containing fuel;
   (b) means for liquefying fuel vapor generated in the fuel tank, the liquefying means including means for cooling the fuel vapor and the cooling means including a casing defining a chamber, a cooling element attached to the casing, a first pipe connecting the chamber to the fuel tank to guide the fuel vapor from the fuel tank to the chamber, and a second pipe connecting the chamber to the fuel tank to return the liquefied fuel from the chamber to the fuel tank; and (c) means for preventing the liquefied fuel from escaping into the atmosphere.

10. The system of claim 9, wherein the first pipe extends into the chamber and a segment of the first pipe within the chamber is helical to help cool the fuel vapor.

11. The system of claim 9, further comprising a valve which normally blocks the second pipe to prevent the fuel vapor from entering the chamber via the second pipe and unblocks the second pipe to return the liquefied fuel to the fuel tank when the level of the liquefied fuel within the chamber exceeds a predetermined value.

12. The system of claim 9, wherein the cooling element comprises a Peltier element having an active part in close contact with the casing, and cooling fins attached to a part of the Peltier element opposite its active part.

13. A fuel tank containing fuel;
   (a) an evaporation pipe guiding fuel vapor generated in the fuel tank;
   (b) means for liquefying the fuel vapor, the liquefying means including a member disposed within the evaporation pipe, the member having an orifice which allows the fuel vapor to pass through the orifice member, and a plate disposed in the evaporation pipe downstream from the orifice member and essentially opposing the orifice in the orifice member whereby fuel vapor exiting from the orifice encounters the plate;
   (c) means for preventing the liquefied fuel from escaping into the atmosphere, the preventing means including a fuel return pipe connecting a segment of the evaporation pipe between the plate and orifice member to the fuel tank to return the liquefied fuel to the fuel tank; and
   (d) a valve which normally blocks the fuel return pipe to prevent the fuel vapor from exiting from the fuel tank via the fuel return pipe and which unblocks the fuel return pipe to return the liquefied fuel to the fuel tank when the volume of the liquefied fuel exceeds a predetermined value.

14. The system of claim 13, wherein the plate extends through the evaporation pipe and having a segment outside the evaporation pipe, and further comprising a cooling device connected to the outside segment of the plate.

15. The system of claim 14, wherein the cooling device comprises a Peltier element having an active part in close contact with the plate, and cooling fins attached to a part of the Peltier element opposite its active part.

16. A fuel-vapor recovery system comprising:
   (a) a fuel tank containing fuel;
   (b) an evaporation pipe guiding fuel vapor generated in the fuel tank;
   (c) means for liquefying the fuel vapor, the liquefying means comprising a member disposed within the evaporation pipe, the member having an orifice which allows the fuel vapor to pass through the orifice member, and a plate disposed in the evaporation pipe downstream from the orifice member and essentially opposing the orifice in the orifice member, the orifice directing a flow discharged from the orifice in a direction essentially perpendicular to and toward the plate whereby the flow effectively encounters the plate; and
   (d) means for returning the liquefied fuel to the fuel tank.

17. A fuel-vapor recovery system comprising:
   (a) a fuel tank for containing fuel;
   (b) means for defining an evaporation passage to channel a flow of fuel vapor generated in the fuel tank;
   (c) a member disposed across the evaporation passage and including orifice means for decreasing the cross-sectional area of the evaporation passage to generate particles of liquid fuel; and
   (d) means, disposed in the evaporation passage downstream from the orifice means, for merging the particles of liquid fuel.

18. The fuel-vapor recovery system of claim 17 wherein the orifice means includes at least one orifice in the member and the merging means includes a plate disposed near the member and facing the orifice whereby the particles of liquid fuel flowing through the orifice impinge upon the plate, the fuel-vapor recovery system further comprising means for returning the merged liquid fuel to the fuel tank.

* * * * *